US009414202B1

(12) United States Patent
Srinivasa et al.

(10) Patent No.: US 9,414,202 B1
(45) Date of Patent: Aug. 9, 2016

(54) SYSTEM AND METHOD FOR PROVIDING SHORT-RANGE, LOW-ENERGY LOCATION SERVICES

(71) Applicant: MARVELL INTERNATIONAL LTD., Hamilton (BM)

(72) Inventors: Sudhir Srinivasa, Campbell, CA (US); Shuangqing Yuan, Fremont, CA (US); Li-Fu Jeng, San Jose, CA (US); Yui Lin, Cupertino, CA (US); Hsun-Yao Jan, Cupertino, CA (US)

(73) Assignee: MARVELL INTERNATIONAL LTD. (BM)

( * ) Notice: Subject to any disclaimer, the term of this patent is extended or adjusted under 35 U.S.C. 154(b) by 0 days.

(21) Appl. No.: 14/843,142

(22) Filed: Sep. 2, 2015

Related U.S. Application Data

(60) Provisional application No. 62/044,844, filed on Sep. 2, 2014.

(51) Int. Cl.
| | |
|---|---|
| *H04W 64/00* | (2009.01) |
| *H04W 4/04* | (2009.01) |
| *H04B 7/08* | (2006.01) |
| *H04W 4/00* | (2009.01) |
| *H04W 76/02* | (2009.01) |

(52) U.S. Cl.
CPC .............. *H04W 4/043* (2013.01); *H04B 7/0805* (2013.01); *H04W 4/008* (2013.01); *H04W 76/02* (2013.01)

(58) Field of Classification Search
CPC ... H04W 64/00; H04W 4/02; H04W 56/0035; H04L 1/0061; H04L 1/0046; H04L 1/1819; H04L 2027/0065; G01S 19/42
See application file for complete search history.

(56) References Cited

U.S. PATENT DOCUMENTS

| | | | | |
|---|---|---|---|---|
| 6,614,860 | B1* | 9/2003 | Piirainen | H04B 7/01 375/341 |
| 2002/0198657 | A1* | 12/2002 | Robbins | G01S 5/009 701/469 |
| 2008/0123560 | A1* | 5/2008 | Nassor | H04L 1/0017 370/255 |

\* cited by examiner

*Primary Examiner* — Quan M Hua (57) ABSTRACT

Improvements associated with determining a location of a station device are described. According to one improvement, a method is performed by a network device. The method includes receiving a response packet from a station device, multiple times, as received signals by switching between a plurality of antennas of the network device during reception of each occurrence of the response packet. The received signals are converted to corrupted orthogonal samples. The response packet is received from the station device a final time as a final response packet via a single antenna of the plurality of antennas. Ideal orthogonal samples are re-generated based at least in part on the final response packet. Signal phase information, embedded in the corrupted and ideal orthogonal samples, is converted into estimated locations of the station device.

20 Claims, 9 Drawing Sheets

Phase differences $\Delta\Phi_2$, $\Delta\Phi_3$, and $\Delta\Phi_4$ are related to angles $\alpha$, $\beta$, $\gamma$, respectively, from FIG. 6.

SYSTEM AND METHOD FOR PROVIDING SHORT-RANGE, LOW-ENERGY LOCATION SERVICES

CROSS REFERENCE TO RELATED APPLICATIONS

This patent disclosure claims the benefit of U.S. Provisional Application Ser. No. 62/044,844 filed on Sep. 2, 2014, which is hereby wholly incorporated by reference.

BACKGROUND

A station device (e.g., a mobile wireless device) may be configured to receive advertisements and other information (e.g., electronic coupons) when near a store or other venue associated with the advertisements and other information. The advertisements and other information may be wirelessly provided to the station device by a network device (e.g., a wireless access point). For example, the network device may be a part of a computer network in a shopping mall having many venues. As a user of the station device moves throughout the shopping mall with the station device, the user may pass by and possibly enter various venues. If the network device knows the current location of the station device, the network device can target specific advertisements and other information, associated with the nearest venues, to the station device. Various approaches to determining a current location of a station device have been attempted with various levels of success. Some issues associated with determining a current location of a station device include location accuracy, energy consumption by the station device, and having to place the station device in a location-based services mode of operation.

SUMMARY

In general, in one aspect this specification discloses a network device that includes a plurality of antennas. The network device also includes signal reception logic operably connected to the plurality of antennas. The signal reception logic is configured to wirelessly receive packets of data transmitted by a station device and convert the packets to orthogonal samples. The network device further includes antenna switching logic configured to switch between the plurality of antennas during each occurrence of reception, by the signal reception logic, of a response packet transmitted multiple times from the station device. This results in the signal reception logic generating corrupted orthogonal samples for each occurrence of reception of the response packet. The network device also includes signal re-generation logic configured to, for each occurrence of reception of the response packet, re-generate ideal orthogonal samples. The ideal orthogonal samples are re-generated based at least in part on a final uncorrupted reception of the response packet, by the signal reception logic via a single antenna of the plurality of antennas, as a final response packet from the station device. The network device further includes location logic configured to generate a set of estimated locations for the station device. The set of estimated locations is generated by converting signal phase information, embedded in the corrupt orthogonal samples and the ideal orthogonal samples, into an estimated location of the station device for each occurrence of reception of the response packet.

In general, in another aspect, this specification discloses a method that is performable, for example, by a network device on a computer network. The method includes transmitting a request packet to a station device. The method also includes receiving a response packet from the station device, multiple times, as received signals by switching between a plurality of antennas of the network device during reception of each occurrence of the response packet. The method further includes converting the received signals, for each occurrence of the response packet received during the switching, to corrupted in-phase/quadrature (IQ) samples. The IQ samples are corrupted due to the switching of the antennas during reception. The method also includes receiving the response packet from the station device a final time as a final response packet. The final response packet is received via a single antenna of the plurality of antennas and is, therefore, uncorrupted. The method further includes, for each occurrence of the response packet received during the switching, re-generating ideal IQ samples based at least in part on the final response packet. The method also includes generating a set of estimated locations for the station device by converting signal phase information, embedded in the corrupted IQ samples and the ideal IQ samples, into an estimated location of the station device for each occurrence of the response packet received during switching.

In general, in another aspect, this specification discloses an integrated circuit device of a network device. In one embodiment, the integrated circuit device includes a plurality of antenna ports configured to operably connect, in one-to-one correspondence, to a plurality of antennas. The integrated circuit device also includes signal reception logic operably connected to the plurality of antenna ports and configured to wirelessly receive packets transmitted from a station device and convert the packets to IQ samples. The integrated circuit device further includes antenna switching logic configured to switch between the plurality of antenna ports during each occurrence of reception, by the signal reception logic, of a response packet transmitted multiple times from the station device. This results in the signal reception logic generating corrupted IQ samples for each occurrence of reception of the response packet. The integrated circuit device also includes signal re-generation logic configured to, for each occurrence of reception of the response packet, re-generate ideal IQ samples based at least in part on a final uncorrupted reception of the response packet, by the signal reception logic via a single antenna port of the plurality of antenna ports, as a final response packet from the station device.

BRIEF DESCRIPTION OF THE DRAWINGS

The accompanying drawings, which are incorporated in and constitute a part of the specification, illustrate various systems, methods, and other embodiments of the disclosure. Illustrated element boundaries (e.g., boxes, groups of boxes, or other shapes) in the figures represent one example of the boundaries. In some examples one element may be designed as multiple elements or multiple elements may be designed as one element. In some examples, an element shown as an internal component of another element may be implemented as an external component and vice versa.

DETAILED DESCRIPTION

Described herein are examples of apparatus, methods, and other embodiments associated with determining the current location of a station device via wireless means. In one embodiment, a network device (e.g., an access point device) communicates with a station device (e.g., a mobile wireless device) to determine a location of the station device. The network device sends a standard request packet (e.g., a feature request packet), acknowledgement (ACK) messages, and negative-acknowledgement (NAK) messages to the station device. The station device sends a standard response packet (e.g., a feature response packet) to the network device. The station device does not have to be in or enter a location-based services mode of any kind. The exchange of standard messages between the network device and the station device are sufficient for the network device to determine a location of the station device.

In accordance with one embodiment, the network device performs a clever technique of antenna switching during multiple receptions of a response packet transmitted from the station device multiple times. The network device has multiple antennas that are spatially separated, providing a different angle-of-arrival between the station device and each antenna of the network device. The multiple receptions of the response packet by the network device provide enough data to help accurately determine a location of the station device. However, the antenna switching during each reception of the response packet results in the corruption, with respect to phase, of IQ samples derived from the response packets. Due to the corruption, the network device sends a NAK message to the station device after each reception of the response packet, causing the station device to re-send the response packet.

The network device ultimately receives the response packet a final time via a single antenna (i.e., no antenna switching and no IQ corruption). By receiving different portions of a response packet via different antennas (via antenna switching) multiple times, and by receiving a final uncorrupted version of the response packet via a single antenna, the network device is able to analyze the phase relationships between the uncorrupted and corrupted IQ samples associated with the response packet to determine a current location of the station device.

In accordance with one embodiment, the network device and the station device communicate with each other according to a Bluetooth Low Energy (BTLE) protocol. For a standard BTLE link, a relatively small amount of data (e.g., 27 bytes) is transferred between the station device and the network device in a response packet. By corrupting the IQ samples, causing NAK messages and multiple response packets to be re-sent, enough data can be gathered to determine a location of the station device.

The term "wireless access point" or "access point (AP)" or "access point device", as used herein with respect to computer networking, refers to a network device that allows wireless devices to connect to a wireless network using a wireless communication standard such as Bluetooth®, or related standards (e.g., Bluetooth Low Energy or BTLE).

The term "station device" or "station", as used herein, refers to a mobile wireless device (e.g., a cellular telephone device) that is capable of wirelessly communicating with an access point (AP).

The terms "wireless communication link", "network link", or "link", as used herein, refer to a cooperative relationship that is formed, which is supported by the exchange of protocol control information, for the purpose of exchanging data between two devices on a computer network. For example, a wireless mobile device may form a network link with an access point in a computer network to gain access to the internet.

The terms "in-phase/quadrature" and "orthogonal" may be used interchangeably herein and refer to data samples derived from received signals (e.g., received data packets) such that amplitude and phase information of the received signals are preserved in the data samples.

The term "request packet", as used herein, refers to a data packet transmitted from a network device to a station device to request information from the station device. For example, a request packet may be a standard feature request packet used to request information related to the capabilities of a station device.

The term "response packet", as used herein, refers to a data packet that is transmitted from a station device to a network device, usually in response to a request packet transmitted from the network device to the station device. For example, a response packet may be a standard feature response packet used to provide information related to the capabilities of a station device.

The terms "ideal orthogonal samples" or "ideal in-phase/quadrature samples", as used herein, refer to signal samples that are generated from the reception of a packet via a single antenna and are, therefore, uncorrupted with respect to phase.

The terms "corrupted orthogonal samples" or "corrupted in-phase/quadrature samples", as used herein, refer to signal samples that are generated as a result of switching between a plurality of antennas during the reception of a packet. The signal samples are corrupted due to the antenna switching (i.e., the phase information embedded in the orthogonal or IQ samples for a packet is shifted multiple times over the length of the packet).

Figure 1:
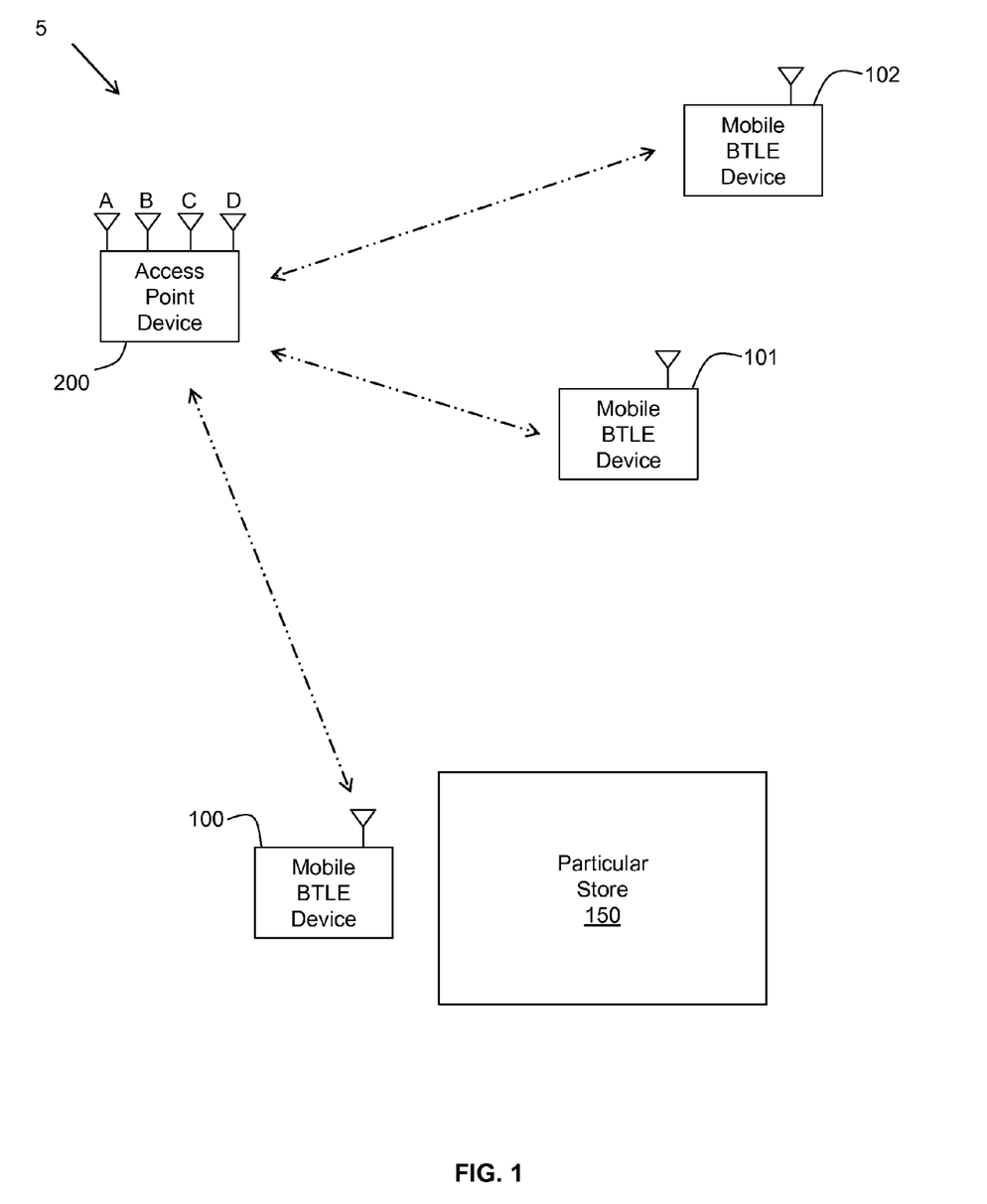
FIG. 1 illustrates an example embodiment of an environment within which the locations of mobile station devices are determined by a network device.

FIG. 1 illustrates an example embodiment of an environment 5 within which the locations of mobile station devices 100, 101, 102 (e.g., BTLE-compatible devices) are present. The mobile station devices may be cellular "smart" phone devices, for example. The environment 5 may be a shopping mall having a number of stores. As shown in FIG. 1, the mobile station device 100 is near (proximate to) a particular store 150. The environment 5 also includes a network device 200 having multiple antennas A, B, C, and D. In accordance with one embodiment, the network device 200 is a wireless access point device that is configured to wirelessly communicate with the mobile station devices 100, 101, 102.

For example, in one embodiment, the network device 200 and each of the mobile station devices 100, 101, 102 are compatible with a Bluetooth Low-Energy (BTLE) communication protocol. The network device 200 is configured to determine the current locations of the mobile station devices 100, 101, 102 via limited communications (e.g., limited BTLE communications) between the network device 200 and the mobile station devices 100, 101, 102 as disclosed herein. In accordance with one embodiment, the techniques described herein for determining the location of a station device work with all standard BTLE devices.

In one embodiment, the network device 200 is an access point device that is a part of a larger computer network. For example, the access point device 200 may be (or may be associated with) a server computer of the computer network configured to provide other services. Once the access point device 200 determines the location of, for example, the mobile station device 100, the access point device 200 (or an associated server computer) may recognize that the mobile station device 100 is near the particular store 150. As a result, the access point device 200 (or the associated server computer via the access point device 200) may transmit specific advertisements and other information, associated with the particular store 150, to the station device 100. In this manner, a user of the station device 100 may decide to enter the store 150 in response to receiving the advertisements and other information (e.g., a coupon). As users of the mobile station devices 100, 101, 102 move around the environment 5, the access point device 200 can continuously or periodically determine the locations of the stations devices 100, 101, 102.

Figure 2:
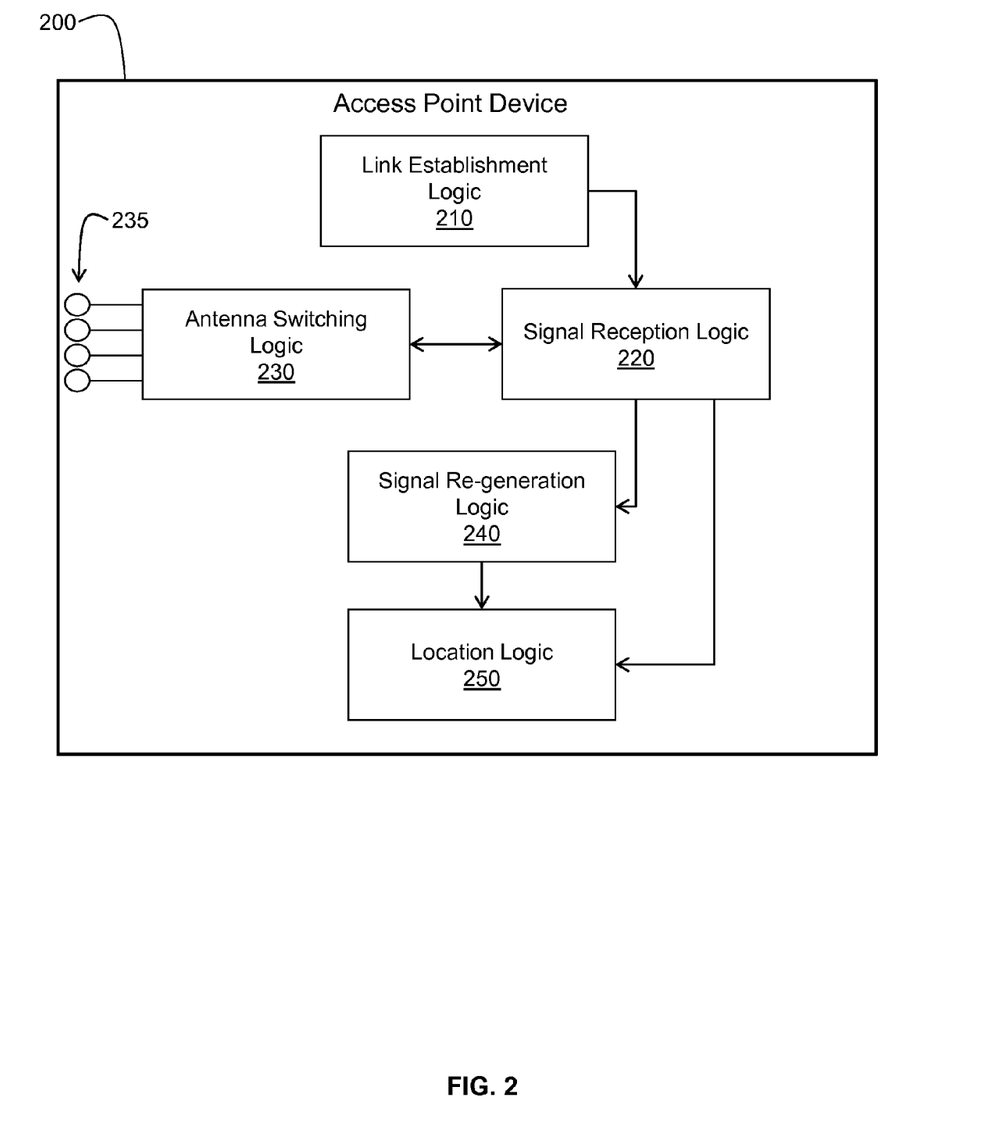
FIG. 2 illustrates an embodiment of the network device of the environment of FIG. 1 configured to determine a location of a mobile station device.

FIG. 2 illustrates an embodiment of the network device 200 of the environment 5 of FIG. 1 configured to determine a location of a mobile station device (e.g., a mobile BTLE device 100). The network device 200 includes link establishment logic 210, signal reception logic 220, antenna switching logic 230, signal re-generation logic 240, and location logic 250. In one embodiment, the network device 200 is a wireless access point device configured to provide access to the internet for mobile station devices.

Figure 8:
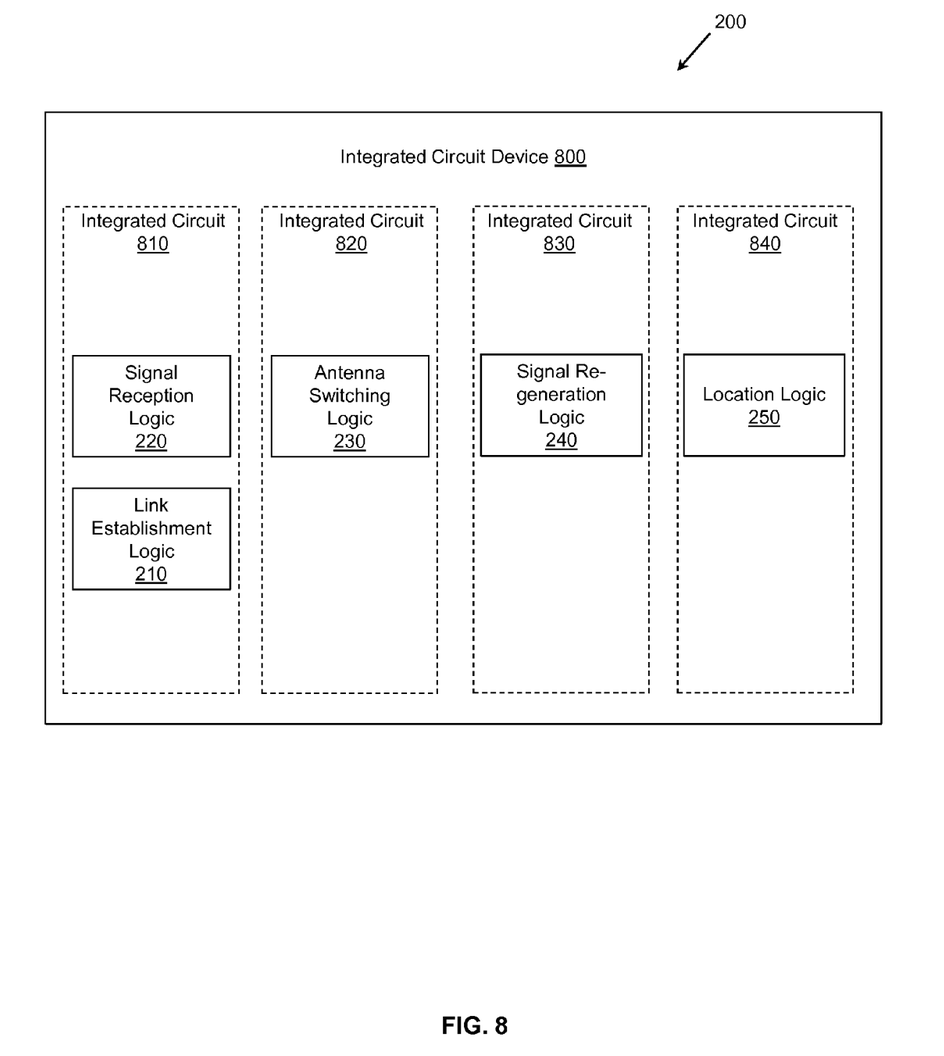
FIG. 8 illustrates one embodiment of the network device of FIG. 2 implemented as an integrated circuit device.

In one embodiment, the network device 200 is implemented on a chip (i.e., as a system-on-chip or SOC configuration) including one or more integrated circuits configured to perform one or more of the functions described herein (see FIG. 8). In another embodiment, the logics of the network device 200 may be part of an executable algorithm configured to perform the functions of the logics where the algorithm is stored in a non-transitory medium.

Referring to FIG. 2, signal reception logic 220 is configured to wirelessly receive packets transmitted by a station device 100 and convert the packets to orthogonal samples (e.g., in-phase/quadrature (IQ) samples). For example, a station device 100 may wirelessly transmit a response packet to the network device 200 in response to the network device 200 wirelessly transmitting a request packet to the station device 100. Signal reception logic 220 is configured to perform all functions associated with wirelessly receiving packets as received signals and converting the received signals into their orthogonal components which preserve amplitude and phase information of the received signals.

In accordance with one embodiment, the network device 200 is configured to determine the location of a station device 100 based on standard request packets and standard response packets. The station device 100 does not have to be in, or enter, a location-based services mode or special mode of any kind. The exchange of standard messages between the network device 200 and the station device 100 are sufficient for the network device 200 to determine a location of the station device 100. No new or special messages are used.

In accordance with one embodiment, link establishment logic 210 is configured to, in cooperation with signal reception logic 220, initially establish a wireless communication link with the station device 100 in accordance with a short-range, low-energy wireless communication protocol (e.g., a BTLE protocol). Establishment of the wireless communication link may include, for example, the exchange of various packet messages between the network device 200 and the station device 100. Establishment of the wireless communication link may be initiated by the station device 100 in one embodiment, and by the network device 200 in another embodiment.

In accordance with one embodiment, the network device 200 includes a plurality of antennas (e.g., A, B, C, D) as shown in FIG. 1. The antennas A, B, C, and D may be configured to operably connect to antenna switching logic 230 via (e.g., in one-to-one correspondence with) a plurality of switchable antenna ports 235 (operable connections). Antenna switching logic 230 is configured to switch between the plurality of antennas A, B, C, and D during each occurrence of reception, by signal reception logic 220, of a response packet. In accordance with one embodiment, the response packet is transmitted multiple times from the station device 100, as is described later herein. Reception of a response packet in this manner (i.e., while switching antennas) results in the associated IQ samples being corrupted with respect to phase information. That is, the IQ samples are corrupted due to the antenna switching such that the phase information embedded in the orthogonal or IQ samples for a packet is shifted multiple times over a length of the packet. The switching of the antennas over a packet is discussed more fully herein with respect to FIG. 4.

In one embodiment, signal re-generation logic 240 is configured to, for each occurrence of reception of the response packet, re-generate ideal IQ samples. Such re-generation of ideal IQ samples is based at least in part on a final uncorrupted reception of the response packet by the signal reception logic 220 via a single antenna (e.g., antenna A) of the plurality of antennas A, B, C, and D as a final response packet, as is described in more detail later herein.

In one embodiment, the final response packet is transmitted by the station device 100 in response to a negative-acknowledgement (NAK) message from the network device 200. When the final response packet is received by the network device 200 as an uncorrupted response packet, the network device 200 transmits an acknowledgement (ACK) message to the station device 100. As a result, the station device 100 does not subsequently re-transmit the response packet. The transmission and reception of the response packet is discussed more fully herein with respect to FIG. 5.

Furthermore, the generation of the ideal IQ samples may be based on scrambler seed data associated with each occurrence of reception of the response packet, as well as the final response packet. In accordance with one embodiment, before a station device transmits the response packet, the response packet is first scrambled or whitened by applying a scrambling algorithm to the response packet using a scrambler seed. Scrambling is the function of replacing a character (or byte) of data with a different character (or byte) of data. The scrambler seed is changed (e.g., in a random manner) for each transmission of the response packet. Therefore, to properly re-generate or recover the ideal IQ samples associated with the response packet, the scrambling (or whitening) is undone by signal re-generation logic 240 using the unique scrambler seed associated with each occurrence of the response packet. In one embodiment, the scrambler seed data is embedded in the response packet.

Furthermore, the response packet may also be encrypted. Encryption is the process of applying a series of algorithms to encode data into nonsensical data. The encryption routine uses a key to create a new pattern from the current data. Therefore, the response packet may also have to be de-crypted. In one embodiment, scrambling is performed before encryption. In another embodiment, encryption is performed before scrambling.

In one embodiment, location logic 250 is configured to generate a set of estimated locations of the station device. Location logic 250 converts signal phase information, embedded in the corrupted IQ samples and the ideal IQ samples, into an estimated location of the station device for each occurrence of reception of the response packet when antenna switching is being performed. The basic idea is that phase information extracted from the IQ samples can be related to an angle-of-arrival (AOA) of a response packet at each antenna of the network device 200 from the station device 100, resulting in a set of angles-of-arrival. The set of angles-of-arrival can be used to estimate the location of the station device 100. Generation of such an estimated location is discussed more fully herein with respect to FIG. 6 and FIG. 7.

In accordance with one embodiment, location logic 250 can average the set of estimated locations of the station device 100 to generate a final location estimate of the station device. The final (averaged) location estimate may be more accurate than any one of the estimated locations in the set of estimated locations.

In this manner, a network device (e.g., a wireless access point device) of a computer network may be configured to estimate the current locations of wireless station devices (e.g., cellular telephones) moving within an environment. Standard messaging techniques may be used (e.g., request, response, NAK, ACK) and a station device does not have to enter any special mode of operation such as, for example, a location-based services mode. In one embodiment, a standard BTLE protocol is used to communicate between a network device and the station devices.

Figure 3:
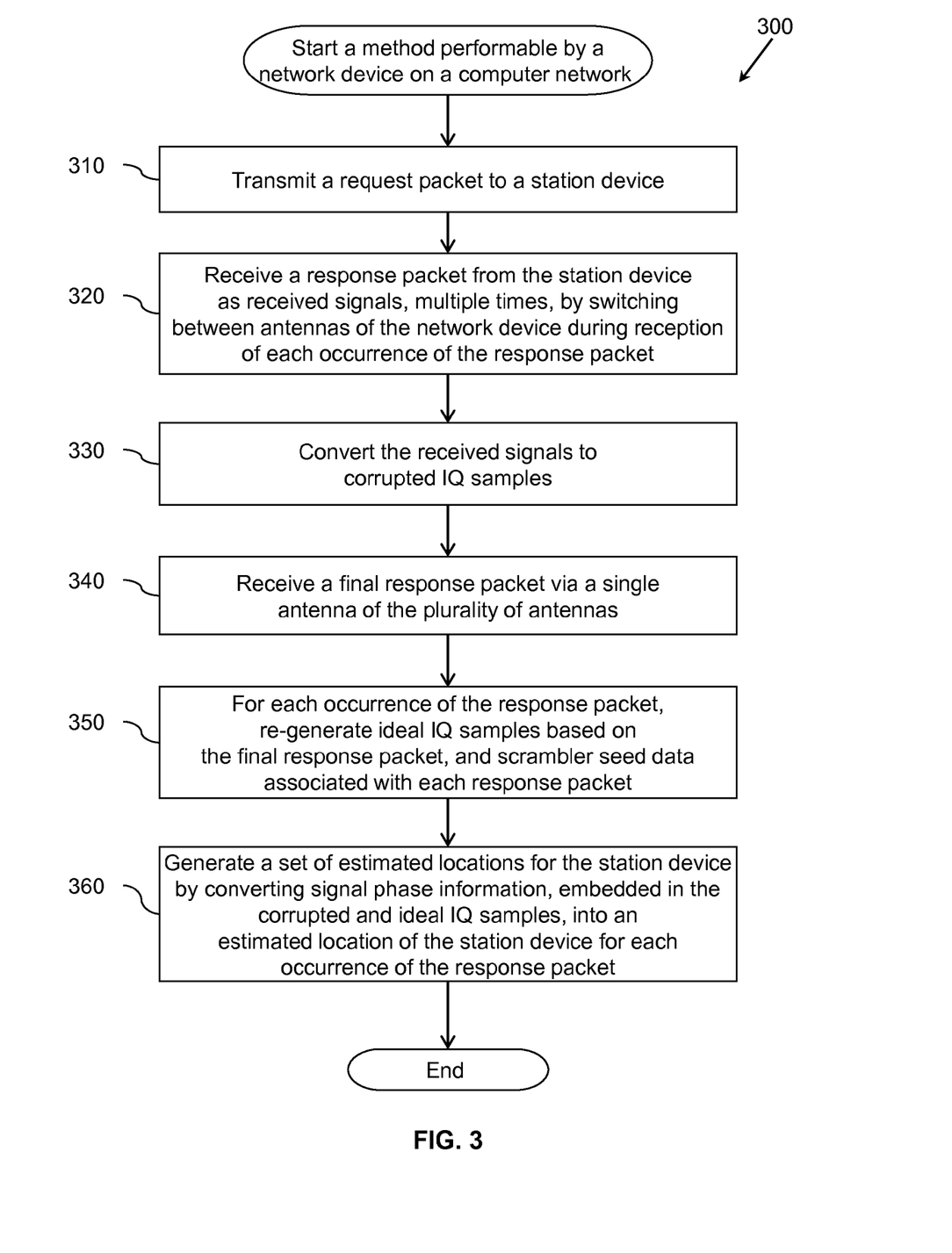
FIG. 3 illustrates an embodiment of a method performable by the network device of FIG. 2 for determining a location of a mobile station device.

FIG. 3 illustrates an embodiment of a method 300 performable by the network device 200 of FIG. 2 for determining a location of a mobile station device 100. Method 300 is implemented to be performed by the network device 200 of FIG. 2, or by a computing device (e.g., an integrated circuit device) configured with an algorithm of method 300. Method 300 will be described from the perspective that the network device 200 (or the computing device) is a wireless access point device operable to communicate (e.g., via BTLE) to a station device (e.g., a wireless mobile device) and connect to a computer network.

Method 300 assumes that a wireless communication link has initially been established between the network device 200 and a station device 100 in accordance with a short-range, low-energy wireless communication protocol (e.g., BTLE). Upon initiating method 300 at 310, the network device 200 transmits a request packet to a station device 100. By transmitting the request packet, the network device 200 is requesting information from the station device 100 such as, for example, feature information related to the capabilities of the station device 100. In one embodiment, the request packet is a feature request packet of a short-range, low-energy wireless communication protocol (e.g., BTLE) configured to request feature information specifying capabilities of the station device 100. The ability of a network device to transmit packets is discussed more fully herein with respect to FIG. 9.

At 320, a response packet is received, from the station device 100, by the network device 200, multiple times, as received signals. Each instance or occurrence of the response packet contains the same response information. In one embodiment, the response packet is a feature response packet of a short-range, low-energy wireless communication protocol (e.g., BTLE) having feature information that specifies capabilities of the station device 100. As each occurrence of the response packet is being received, the network device switches between antennas A, B, C, and D. The switching of antennas ensures that resultant IQ samples will be corrupted (shifted) with respect to phase over a length of the response packet. The number of times the response packet is received, during antenna switching, is pre-programmed into the network device 200, in accordance with one embodiment. In accordance with one embodiment, reception of the response packet is performed by signal reception logic 220 and antenna switching is performed by antenna switching logic 230.

Figure 4:
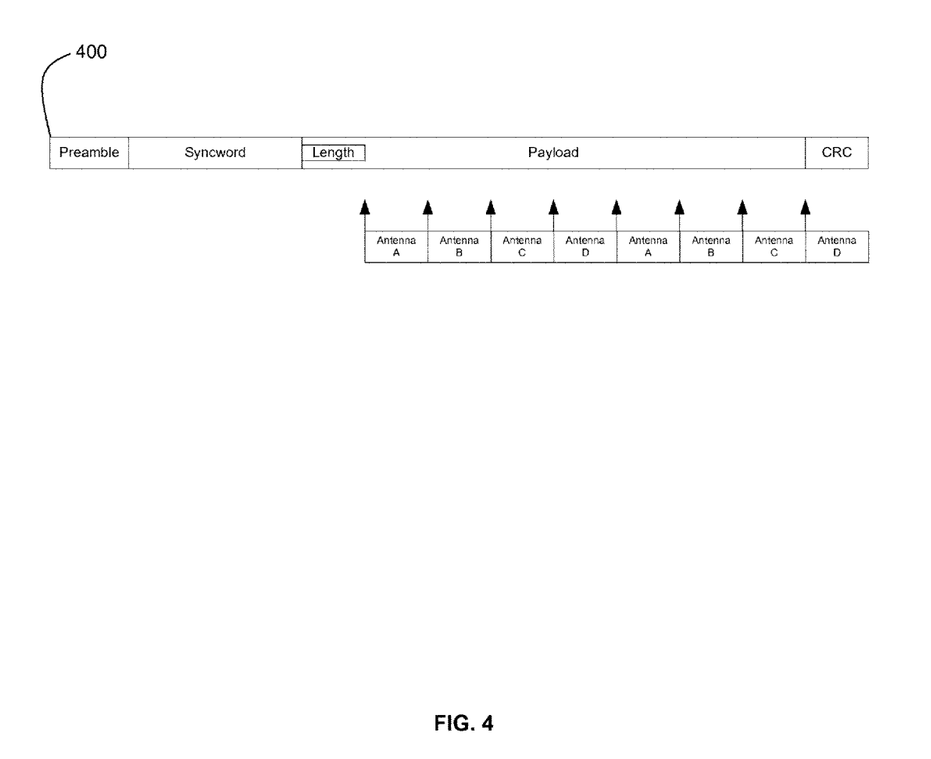
FIG. 4 illustrates an embodiment of a response packet received by the network device of FIG. 2 while switching between a plurality of antennas.

FIG. 4 illustrates an embodiment of a response packet 400 received by the network device 200 of FIG. 2 while switching between a plurality of antennas A, B, C, and D. The response packet 400 is arranged into several sections including a preamble, a syncword, a payload, and a cyclic redundancy check (CRC). As seen in FIG. 4, the antennas are switched such that various portions of the payload are received by a different antenna. The CRC is used for verifying the packet data associated with the response packet 400. If one or more bits of the packet have been corrupted (e.g., due to antenna switching), the CRC check will fail and a NAK packet will be generated.

A NAK packet is transmitted to the station device 100 by the network device 200 in response to the reception of each response packet that is corrupted due to antenna switching. Reception of a NAK packet by the station device 100 triggers the station device to re-transmit the response packet. As a result, multiple response packets are transmitted by the station device 100. Again, the number of times the response packet is received, during antenna switching, is pre-programmed into the network device 200, in accordance with one embodiment.

Figure 5:
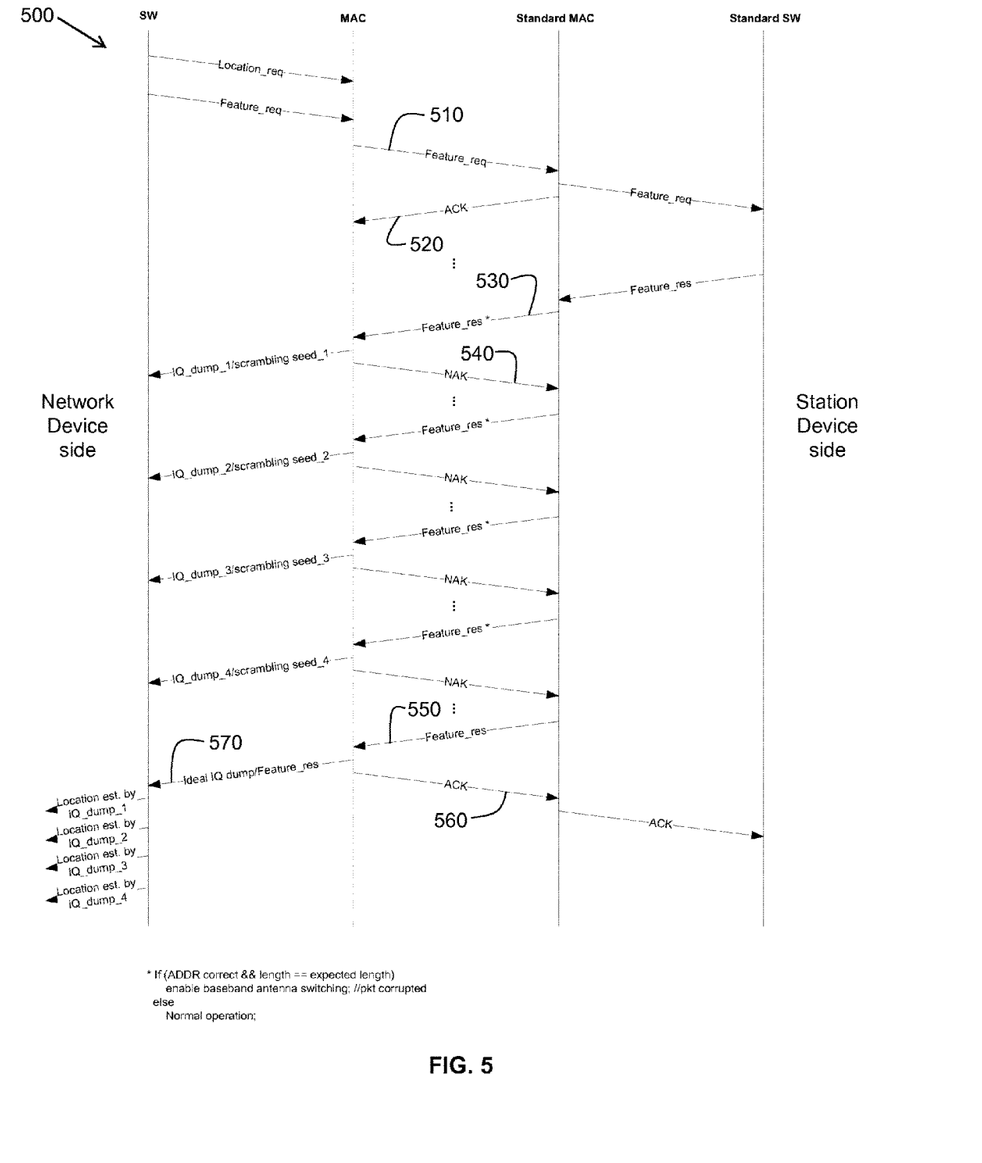
FIG. 5 illustrates an example embodiment of a packet exchange, between the network device of FIG. 2 and a mobile station device of FIG. 1, which occurs during the method of FIG. 3.

FIG. 5 illustrates an example embodiment of a packet exchange 500, between the network device 200 of FIG. 2 and the mobile station device 100 of FIG. 1, which occurs during the method 300 of FIG. 3. As seen in FIG. 5, a request packet (Feature_req 510) is sent from a network device side of the exchange 500 to a station device side of the exchange 500. The request packet is acknowledged (ACK packet 520) by the station device side, and the station device side sends a response packet (Feature_res 530) to the network device side.

Referring again to FIG. 3, at 330, the received signals are converted to in-phase/quadrature (IQ) samples for each occurrence of the response packet. The IQ samples are corrupted with respect to phase due to antenna switching during reception. In one embodiment, the conversion of the received signals to IQ samples is performed by signal reception logic 220. For example, in one embodiment, the received signals are analog signals that are digitized (e.g., by an analog-to-digital converter) and converted to digital IQ samples by signal reception logic 220.

Referring again to FIG. 5, the network device side receives and converts the response packet to corrupted IQ samples (IQ_dump_1) due to antenna switching. Since the response packet is corrupted, the network side sends a negative-acknowledgement packet (NAK 540) to the station device side, indicating that the response packet was not properly received. In FIG. 5, this process is repeated three (3) more times resulting in corrupted IQ samples IQ_dump_2, IQ_dump_3, and IQ_dump_4 at the network device side.

At 340, the response packet is received, from the station device side, a final time at the network device side as a final response packet (Feature_res 550 in FIG. 5) via a single antenna of the plurality of antennas (e.g., antenna A . . . no antenna switching). Resultant IQ samples associated with the final response packet are uncorrupted with respect to phase. In one embodiment, the reception of the final response packet is performed by signal reception logic 220. Referring to FIG. 5, an acknowledgement packet (ACK 560) is transmitted to the station device side from the network device side in response to the reception of the final response packet since the final response packet is received by the network device side in an uncorrupted manner, resulting in ideal IQ samples (Ideal IQ dump 570) for the final response packet.

At 350, for each occurrence of reception of the response packet received during antenna switching, ideal IQ samples are re-generated based at least in part on the final response packet. In accordance with one embodiment, the ideal IQ samples are re-generated by signal re-generation logic 240. Such re-generation of ideal IQ samples is based at least in part on the final uncorrupted reception of the final response packet by the signal reception logic 220 via a single antenna (e.g., antenna A) of the plurality of antennas A, B, C, and D. Furthermore, as discussed above herein, the generation of the ideal IQ samples may also be based on scrambler seed data associated with each occurrence of reception of the response packet, as well as the final response packet.

Again, referring to FIG. 5, the final response packet (Feature_res 550) is transmitted by the station device side in response to a negative-acknowledgement (NAK) message from the network device side. When the final response packet is received by the network device side as an uncorrupted response packet (Ideal IQ dump 570), the network device side transmits an acknowledgement (ACK) message 560 to the station device side. As a result, the station device side does not subsequently re-transmit the response packet. Therefore, that response packet (Feature_res 550) is truly the final response packet.

By having ideal IQ samples, for each response packet received via antenna switching, the ideal IQ samples can serve as a phase reference to aid in the determination of location of the station device. At 360, a set of estimated locations is generated for the station device 100 by converting signal phase information, embedded in the corrupted IQ samples and the ideal IQ samples, into an estimated location of the station device 100 for each occurrence of the response packet received during antenna switching.

Referring to FIG. 5, the estimated locations associated with each occurrence of the response packet received during antenna switching are Location est. by_IQ_dump_1, Location est. by_IQ_dump_2, Location est. by_IQ_dump_3, and Location est. by_IQ_dump_4. In accordance with one embodiment, generation of the set of estimated locations is performed by location logic 250. A single, final location of the station device 100 may be estimated by averaging the set of estimated locations. In one embodiment, the averaging is also performed by location logic 250.

Again, in this manner, a network device (e.g., a wireless access point device) of a computer network may be configured to estimate the current locations of wireless station devices (e.g., cellular telephones) moving within an environment. Standard messaging techniques may be used (e.g., request, response, NAK, ACK) and a station device does not have to enter any special mode of operation such as, for example, a location-based services mode. In one embodiment, a standard BTLE protocol is used to communicate between a network device and the station devices.

Figure 6:
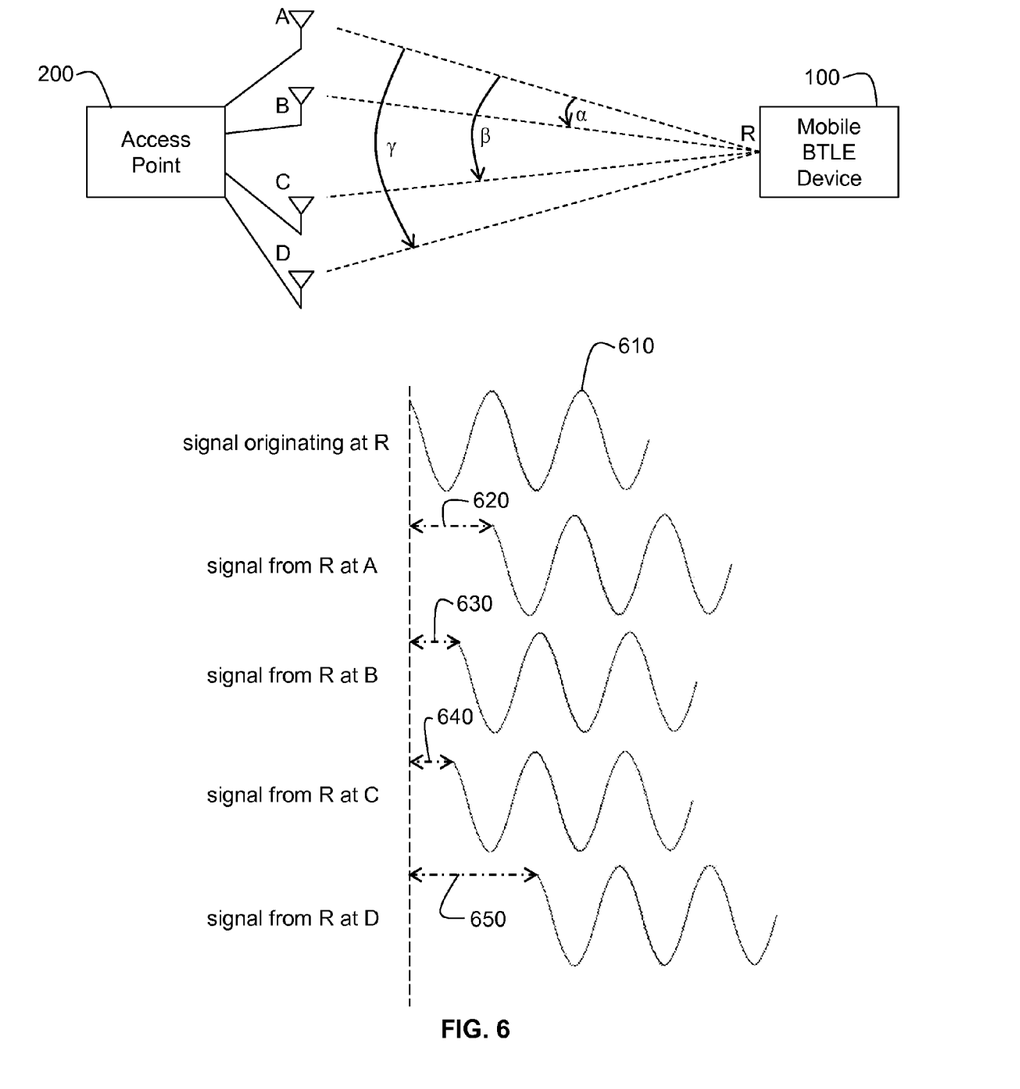
FIG. 6 illustrates the relationship between angle-of-arrival and phase of a packet signal transmitted from a mobile station device of FIG. 1 to the network device of FIG. 2.

FIG. 6 illustrates the relationship between angle-of-arrival and phase of a packet signal transmitted from the mobile station device 100 of FIG. 1 to the network device 200 of FIG. 2. A signal 610 originating at point R (i.e., at the station device 100) is shown in FIG. 6. When that same signal 610 reaches antenna A of network device 200, the signal 610 is shifted in phase by an amount 620. Similarly, when the same signal 610 reaches antennas B, C, and D, the signal 610 is shifted in phase by amounts 630, 640, and 650, respectively. The different amounts in phase shifts are due to the different distances between the station device 100 at point R and each of the antennas A, B, C, and D.

The distance between point R and each of the antennas is different because the antennas A, B, C, and D are spaced apart in relation to each other. As a result, there is an angle $\alpha$ between antennas A and B from the point of view of point R. Similarly, there is an angle $\beta$ between antennas A and C, and an angle $\gamma$ between antennas A and D.

Figure 7:
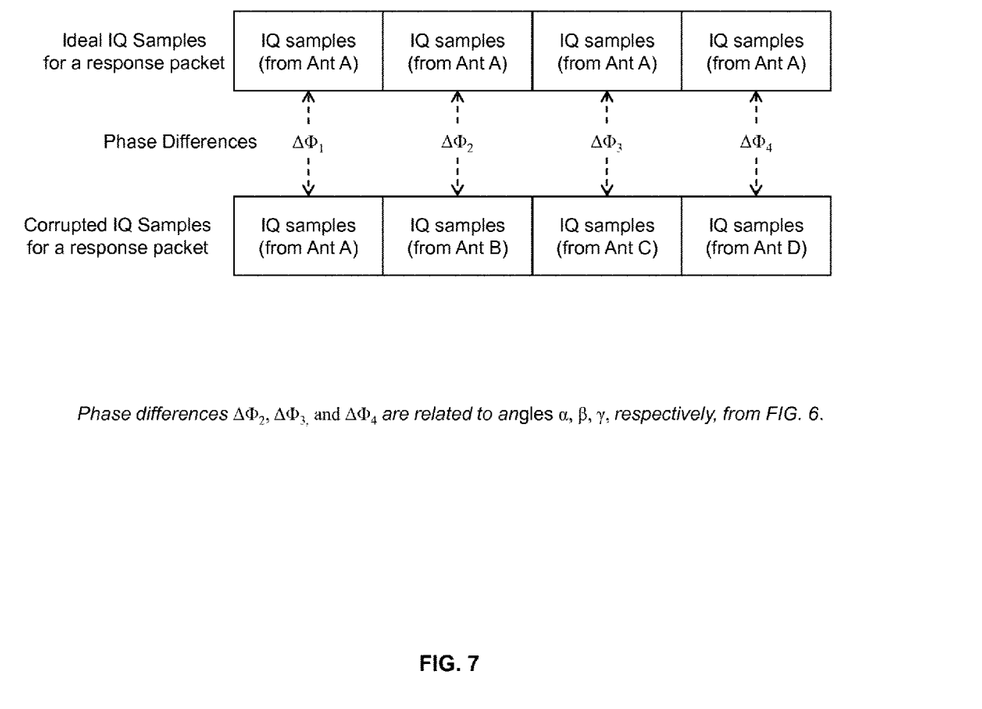
FIG. 7 illustrates the signal phase differences that occur between corrupted IQ samples and ideal IQ samples generated by the network device of FIG. 2 for a single occurrence of reception of a response packet.

FIG. 7 illustrates the signal phase differences ($\Delta\phi_1$, $\Delta\phi_2$, $\Delta\phi_3$, $\Delta\phi_4$) that occur between corrupted IQ samples and ideal IQ samples generated by the network device 200 of FIG. 2 for a single occurrence of reception of a response packet. The corrupted IQ samples correspond to the response packet as originally received during antenna switching. The ideal IQ samples correspond to the same response packet as re-generated by signal re-generation logic 240. Again, the phase information is inherently embedded in the IQ samples. The phase difference $\Delta\phi_1$ is zero (0) degrees since the ideal IQ samples and the corrupted IQ samples correspond to the same antenna A. The phase differences $\Delta\phi_2$, $\Delta\phi_3$, and $\Delta\phi_4$ are related to angles $\alpha$, $\beta$, and $\gamma$, respectively, from FIG. 6. Thus, the angles $\alpha$, $\beta$, and $\gamma$ can be mathematically derived from the phase differences $\Delta\phi_2$, $\Delta\phi_3$, and $\Delta\phi_4$.

Furthermore, the location of the station device 100 with respect to the network device 200 can be estimated based on the angles $\alpha$, $\beta$, and $\gamma$ using angle-of-arrival (AOA) techniques. As the station device 100 moves closer to or further away from the network device 200, the angles $\alpha$, $\beta$, and $\gamma$ will change, and the location estimate for the station device can be re-estimated. Again, in accordance with one embodiment, a location estimate for a station device based on an occurrence of receiving a response packet is performed by location logic 250 of FIG. 2.

The phase difference comparison of FIG. 7 is performed for each occurrence of the response packet that was received during antenna switching. Therefore, a location estimate is generated for each occurrence of the response packet, resulting in a set of estimated locations for a station device. Again, the set of estimated locations may be averaged to arrive at a single, more accurate location estimate for the station device.

In this manner, phase information embedded in response packets is related to angles-of-arrival from the station device. The angles-of-arrival are used to estimate a location of the station device. Having multiple antennas operably connected to a network device in known spaced relation allows such a location-determining process to be accomplished. By switching between a plurality of antennas during reception of a response packet by the network device, phase information is generated which can be related to a location of the station device from which the response packet is transmitted.

Integrated Circuit Device Embodiment

FIG. 8 illustrates one example embodiment of the network device 200 of FIG. 2 implemented as an integrated circuit device 800. In this embodiment, link establishment logic 210 and signal reception logic 220 are embodied on an integrated circuit 810. Furthermore, antenna switching logic 330, signal re-generation logic 240, and location logic 250 are each embodied as a separate integrated circuit 820, 830, and 840, respectively.

The circuits are connected via connection paths to communicate signals. While integrated circuits 810, 820, 830, and 840 are illustrated as separate integrated circuits, they may be integrated into a common integrated circuit device 800. Additionally, integrated circuits 810, 820, 830, and 840 may be combined into fewer integrated circuits or divided into more integrated circuits than illustrated.

In another embodiment, link establishment logic 210, signal reception logic 220, antenna switching logic 230, signal re-generation logic 240, and location logic 250 (which are illustrated in integrated circuits 510, 520, 530, and 540) may be combined into a separate application-specific integrated circuit. In other embodiments, portions of the functionality associated with signal reception logic 220, antenna switching logic 230, signal re-generation logic 240, and location logic 250 may be embodied as firmware executable by a processor and stored in a non-transitory memory (e.g., a non-transitory computer storage medium).

Bluetooth Low Energy (BTLE) Embodiment

Figure 9:
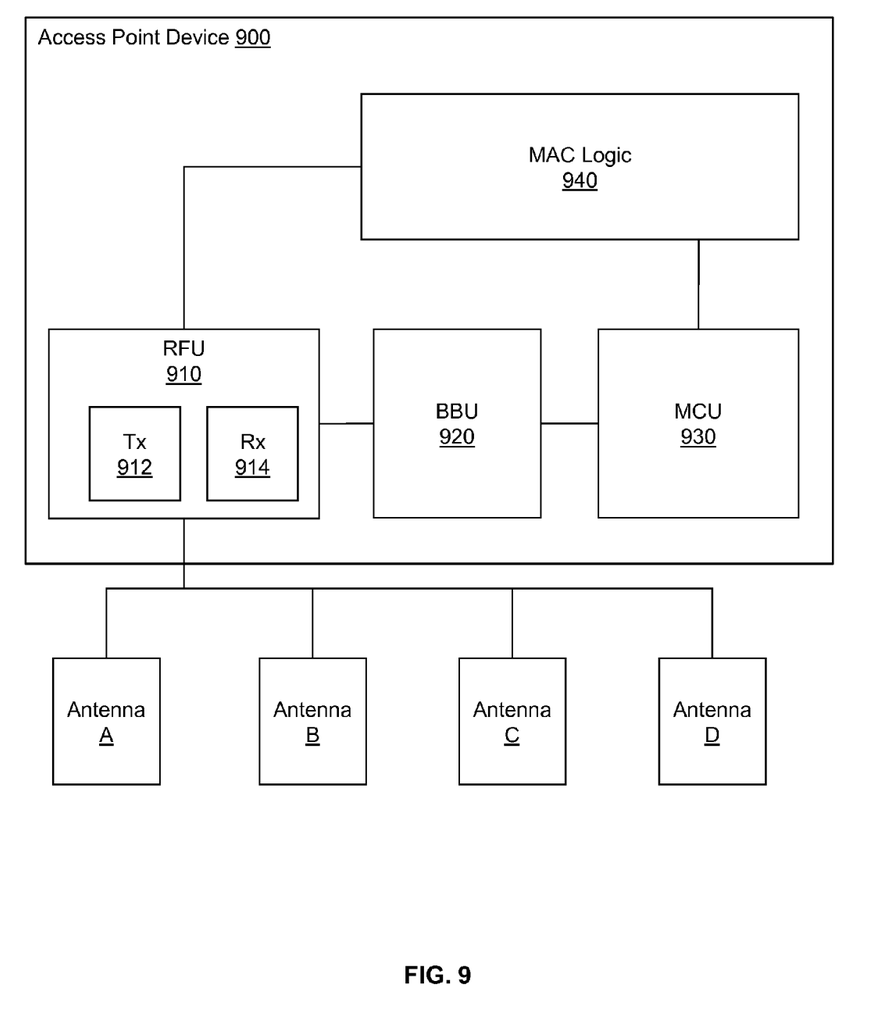
FIG. 9 illustrates another embodiment of the network device of the environment of FIG. 1 configured to determine a location of a mobile station device.

FIG. 9 illustrates another embodiment of a network device 900 of the environment of FIG. 1 configured to determine a location of a mobile station device 100 using the method 300 of FIG. 3 on a BTLE compatible computer network. In one embodiment, the network device 900 is a wireless access point device that is BTLE compatible. The access point device 900 includes a radio frequency unit (RFU) 910, a baseband unit (BBU) 920 and a media access control (MAC) hardware unit (MCU) 930. The radio frequency unit 910 is operably connected to an antennas A, B, C, and D. The radio frequency unit 910 includes both a receive (Rx) circuit 914 and a transmit (Tx) circuit 912.

In one embodiment, the transmit circuit 912 is configured to transmit radio frequency signals (e.g., a request packet) via the antenna A, and the receive circuit 914 is configured to receive radio frequency signals (e.g., a response packet) via the antennas A, B, C, and D. The baseband unit 920 is configured to analyze radio frequency signals received by the radio frequency unit 910, and to provide received information (e.g., IQ samples) to the MCU 930. The MCU 930 is configured to work in cooperation with the baseband unit 920 to provide information to MAC logic 940. MAC logic 940 is configured to perform the functionality of various modes of operation and control the radio frequency unit in accordance with a current mode of operation (e.g. a location-based services mode of operation).

In the embodiment of FIG. 9, the functions of the logics of FIG. 2 (link establishment logic 210, signal reception logic 220, antenna switching logic 230, signal re-generation logic 240, and location logic 250) are distributed among the elements of the access point device 900. For example, in one embodiment, the functionality of location logic 250 may be implemented in MAC logic 940. The functionality of signal reception logic 220 may be implemented in receive (Rx) circuit 914 and BBU 920. The functionality of antenna switching logic 230 may collectively be supported by all of the elements of the access point device 900, including the antennas A, B, C, and D.

The MAC hardware unit 930 and the radio frequency unit 910 are configured to communicate with MAC logic 940 in various modes including a location-based services mode. MAC logic 940 is configured to receive IQ samples, derived from response packets transmitted by a station device, from the MAC hardware unit 930 and provide acknowledge (ACK) and negative-acknowledge (NAK) messages to the radio frequency unit 910. A NAK message transmitted by transmit (TX) circuit 912 to a station device tells the station device to re-transmit a response packet. While location-based service operation is described, MAC logic 940 can control the radio frequency unit 910 to operate in other modes that use various combinations of transmit and receive protocols (e.g., a mode for sending advertisements and other information to a station device once the location of the station device is determined in a location-based services mode.

In different embodiments, MAC logic 940 can be, but is not limited to, hardware, firmware, instructions in execution on a machine, and/or combinations thereof to perform a function(s) or an action(s), and/or to cause a function or action from another logic, method, apparatus, and/or system. MAC logic 940 may include a software controlled microprocessor, a discrete logic (e.g., ASIC), an analog circuit, a digital circuit, a programmed logic device, a memory device containing instructions, and so on. MAC logic 940 may include one or more gates, combinations of gates, or other circuit components. Other "logics" described herein may take forms similar to those described in connection with MAC logic 940.

Apparatus, methods, and other embodiments associated with location-based services have been described. According to one embodiment, a wireless access point device includes antenna switching logic, signal reception logic, signal re-generation logic, and location logic. The signal reception logic is configured to wirelessly receive packets transmitted by a station device and convert the packets into orthogonal (IQ) samples. The antenna switching logic is configured to switch between a plurality of antennas of the wireless access point device during each occurrence of reception, by the signal reception logic, of a response packet transmitted multiple times from the station device. The resulting orthogonal (IQ) samples are corrupted by the antenna switching. The signal re-generation logic is configured to, for each occurrence of reception of the response packet, re-generate ideal orthogonal (IQ) samples based at least in part on a final response packet. The final response packet is simply the response packet received, uncorrupted, from the station device by the signal reception logic via a single antenna of the plurality of antennas. The location logic is configured to convert signal phase information, embedded in the corrupted orthogonal (IQ) samples and the ideal orthogonal (IQ) samples, into an estimate of the location of the station device for each occurrence of reception of the response packet.

DEFINITIONS AND OTHER EMBODIMENTS

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable medium" or "computer storage medium", as used herein, refers to a non-transitory medium that stores instructions and/or data configured to perform one or more of the disclosed functions when executed. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C §101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. §101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional actions that are not illustrated in blocks. The methods described herein are limited to statutory subject matter under 35 U.S.C §101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

To the extent that the phrase "one or more of, A, B, and C" is used herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be used.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. §101.

What is claimed is:

1. A network device comprising:
   a plurality of antennas;
   signal reception logic operably connected to the plurality of antennas and configured to wirelessly receive packets transmitted by a station device and convert the packets to orthogonal samples;
   antenna switching logic configured to switch between the plurality of antennas during each occurrence of reception, by the signal reception logic, of a response packet transmitted multiple times from the station device, resulting in corrupted orthogonal samples for each occurrence of reception of the response packet;
   signal re-generation logic configured to, for each occurrence of reception of the response packet, re-generate ideal orthogonal samples based at least in part on a final uncorrupted reception of the response packet, by the signal reception logic via a single antenna of the plurality of antennas, as a final response packet from the station device; and
   location logic configured to generate a set of estimated locations for the station device by converting signal phase information, embedded in the corrupted orthogonal samples and the ideal orthogonal samples, into an estimated location of the station device for each occurrence of reception of the response packet.

2. The network device of claim 1, further comprising link establishment logic configured to, in cooperation with the signal reception logic, initially establish a wireless communication link with the station device in accordance with a short-range, low-energy wireless communication protocol.

3. The network device of claim 1, wherein the location logic is further configured to generate a final location of the station device by averaging the set of estimated locations.

4. The network device of claim 1, wherein the signal re-generation logic is configured to, for each occurrence of reception of the response packet, re-generate the ideal orthogonal samples based on the final response packet and scrambler seed data associated with each occurrence of reception of the response packet.

5. The network device of claim 1, wherein the station device is a mobile wireless device, and wherein the network device is a wireless access point in a computer network.

6. A method performable by a network device on a computer network, the method comprising:
transmitting a request packet to a station device;
receiving a response packet from the station device, multiple times, as received signals by switching between a plurality of antennas of the network device during reception of each occurrence of the response packet;
converting the received signals, for each occurrence of the response packet received during the switching, to corrupted in-phase/quadrature samples which are corrupted due to the switching;
receiving the response packet from the station device a final time as a final response packet via a single antenna of the plurality of antennas;
for each occurrence of the response packet received during the switching, re-generating ideal in-phase/quadrature samples based at least in part on the final response packet; and
generating a set of estimated locations for the station device by converting signal phase information, embedded in the corrupted in-phase/quadrature samples and the ideal in-phase/quadrature samples, into an estimated location of the station device for each occurrence of the response packet received during the switching.

7. The method of claim 6, further comprising generating a final location of the station device by averaging the set of estimated locations.

8. The method of claim 6, further comprising initially establishing a wireless communication link with the station device in accordance with a short-range, low-energy wireless communication protocol.

9. The method of claim 6, wherein the ideal in-phase/quadrature samples are generated based further on scrambler seed data associated with each occurrence of the response packet received during the switching.

10. The method of claim 6, further comprising transmitting a negative-acknowledgement packet to the station device, in response to each occurrence of the response packet received during the switching, to trigger the station device to re-transmit the response packet.

11. The method of claim 6, further comprising transmitting an acknowledgement packet to the station device in response to receiving the final response packet.

12. The method of claim 6, wherein the response packet includes the same response information each time the response packet is received by the network device.

13. The method of claim 6, wherein the request packet is a feature request packet, of a short-range, low-energy wireless communication protocol, configured to request feature information specifying capabilities of the station device.

14. The method of claim 6, wherein the response packet is a feature response packet, of a short-range, low-energy wireless communication protocol, having feature information specifying capabilities of the station device.

15. The method of claim 6, wherein the station device is a mobile wireless device, and wherein the network device is a wireless access point in the computer network.

16. An integrated circuit device, comprising:
a plurality of antenna ports configured to operably connect, in one-to-one correspondence, to a plurality of antennas;
signal reception logic operably connected to the plurality of antenna ports and configured to wirelessly receive packets transmitted from a station device and convert the packets to in-phase/quadrature samples;
antenna switching logic configured to switch between the plurality of antenna ports during each occurrence of reception, by the signal reception logic, of a response packet transmitted multiple times from the station device, resulting in corrupted in-phase/quadrature samples for each occurrence of reception of the response packet; and
signal re-generation logic configured to, for each occurrence of reception of the response packet, re-generate ideal in-phase/quadrature samples based at least in part on a final uncorrupted reception of the response packet, by the signal reception logic via a single antenna port of the plurality of antenna ports, as a final response packet from the station device.

17. The integrated circuit device of claim 16, further comprising location logic configured to generate a set of estimated locations for the station device by converting signal phase information, embedded in the corrupted in-phase/quadrature samples and the ideal in-phase/quadrature samples, into an estimated location of the station device for each occurrence of reception of the response packet.

18. The integrated circuit device of claim 16, further comprising link establishment logic configured to, in cooperation with the signal reception logic, initially establish a wireless communication link with the station device in accordance with a short-range, low-energy wireless communication protocol.

19. The integrated circuit device of claim 16, wherein the signal re-generation logic is configured to, for each occurrence of reception of the response packet, re-generate the ideal in-phase/quadrature samples based on the final response packet and scrambler seed data associated with each occurrence of reception of the response packet.

20. The integrated circuit device of claim 16, wherein the station device is a mobile wireless device, and wherein the integrated circuit device is configured to be part of a wireless access point in a computer network.

* * * * *